Nov. 5, 1963  R. M. ULRICH  3,109,353
ROAD BASE SPREADING APPARATUS
Filed Feb. 24, 1960  5 Sheets-Sheet 1
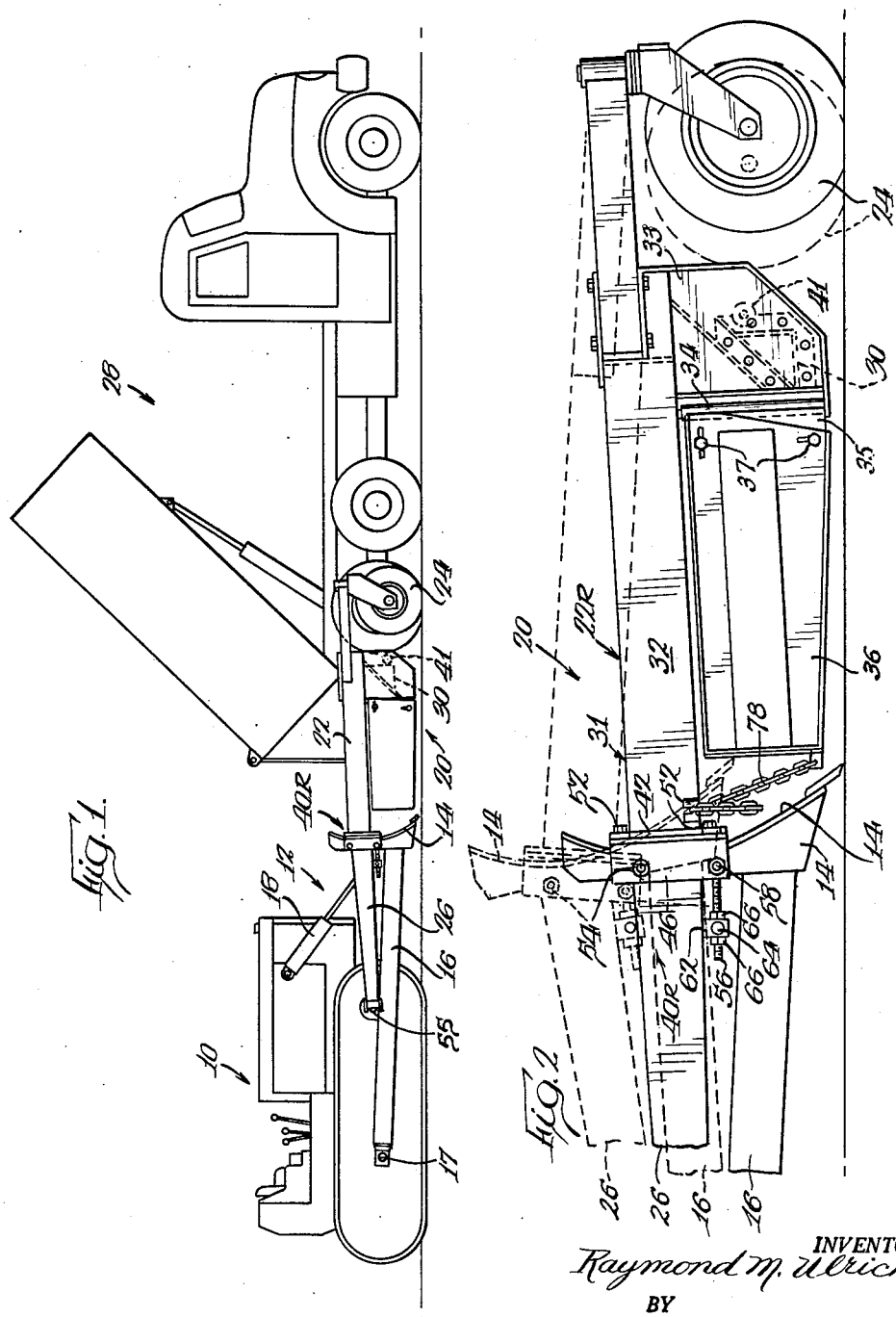
INVENTOR.
Raymond M. Ulrich
BY
Brown, Jackson, Boettcher & Dienner
Attys.

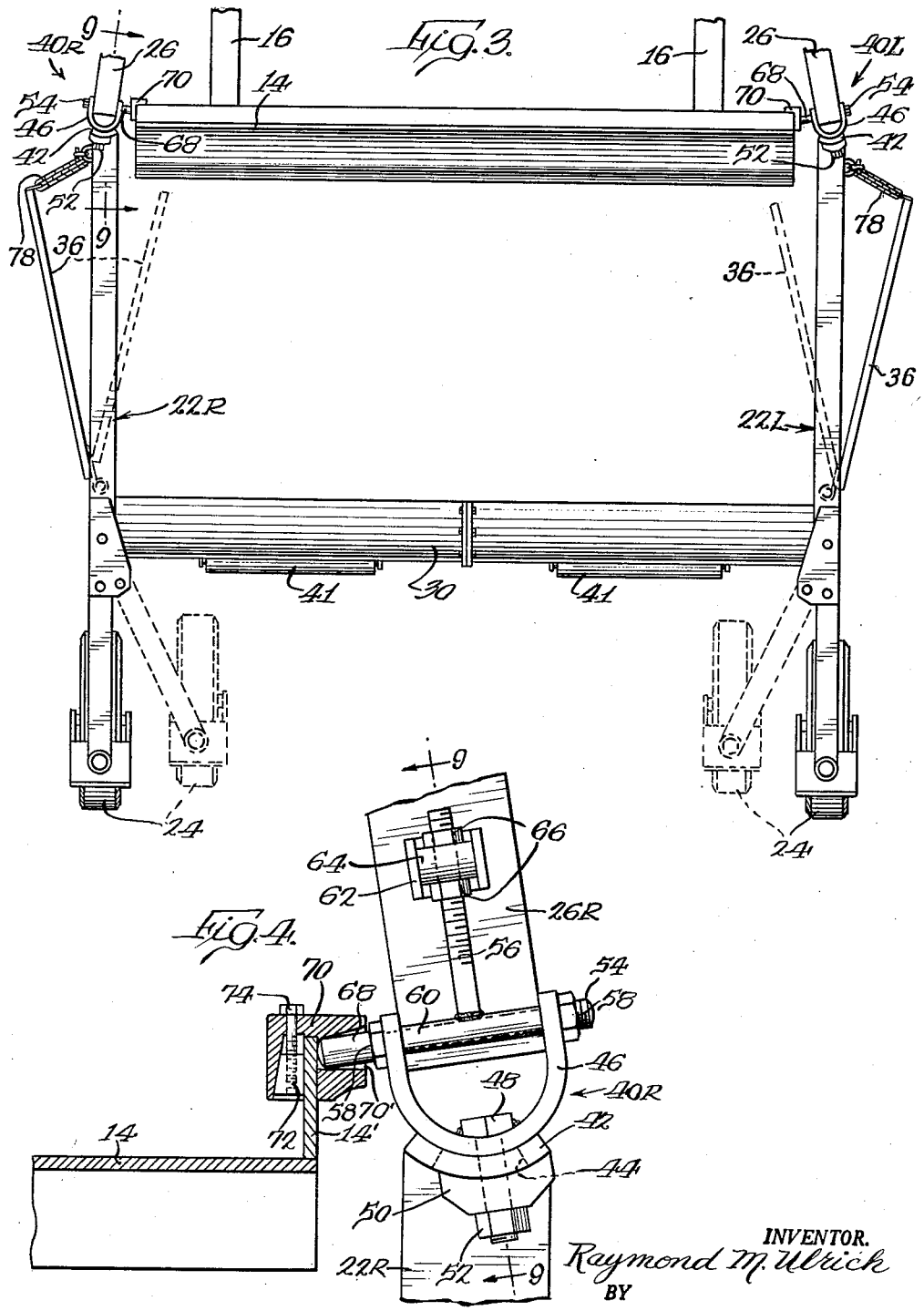

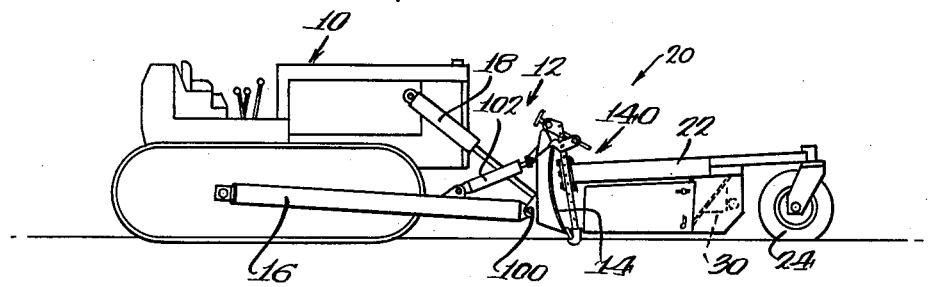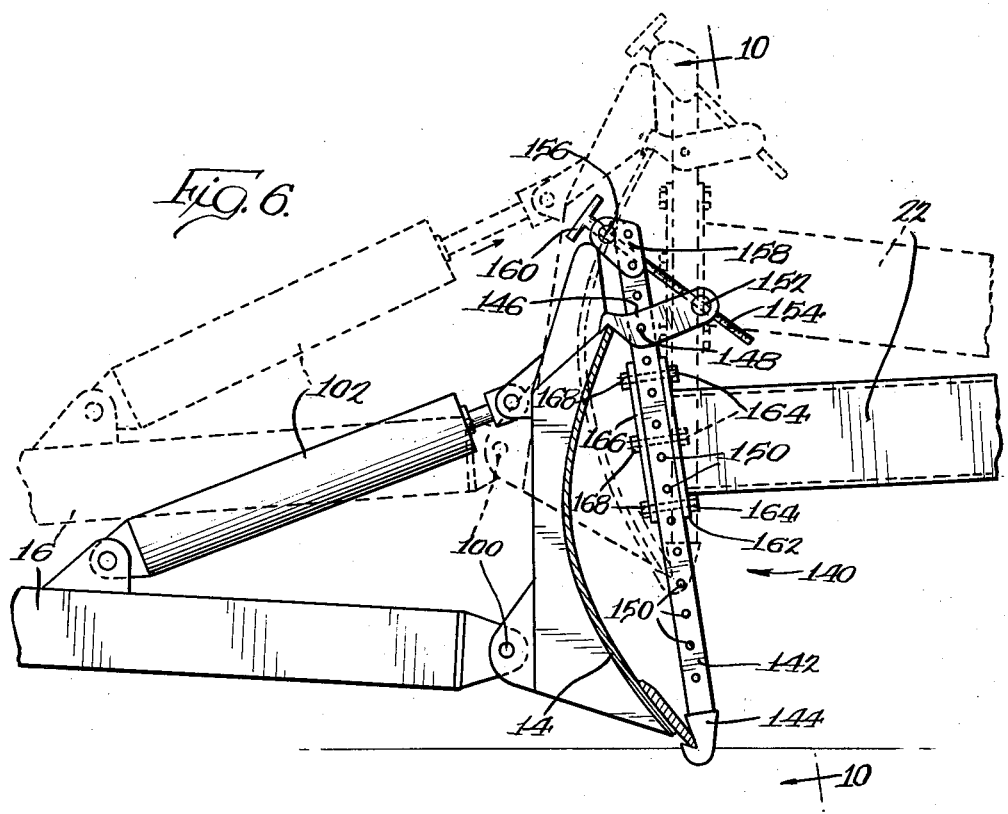

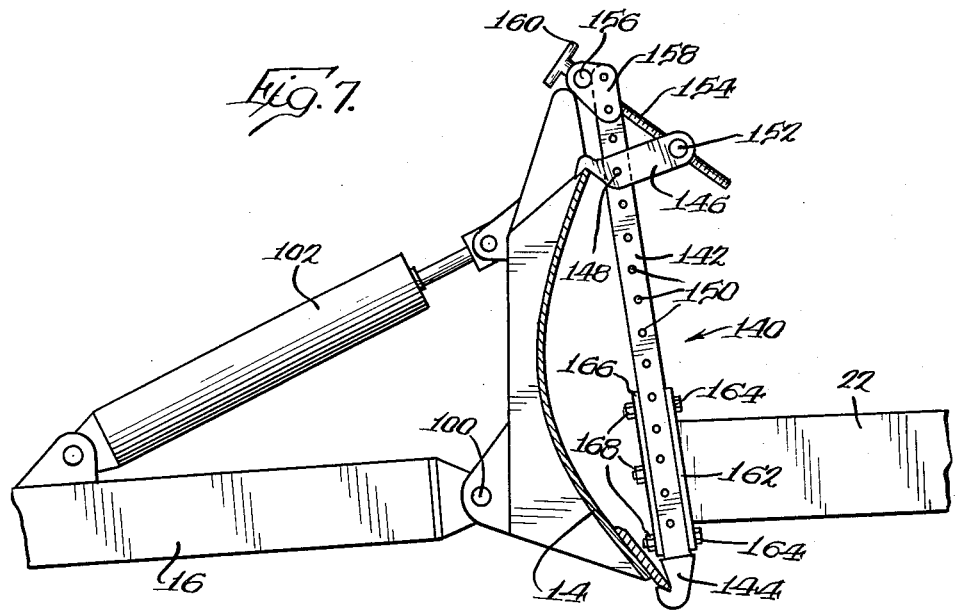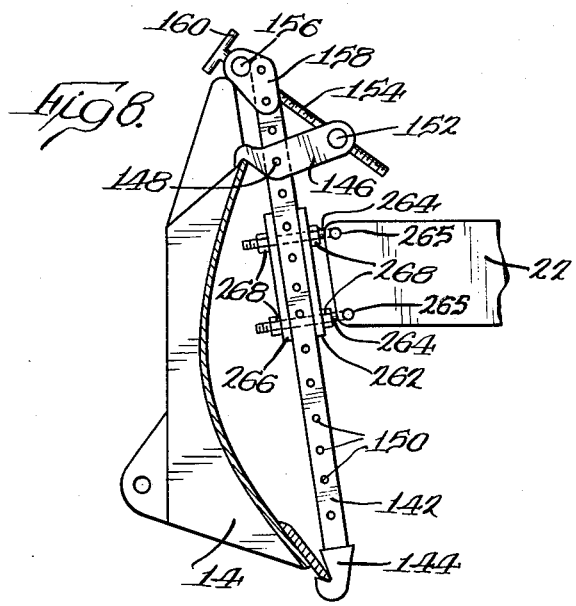

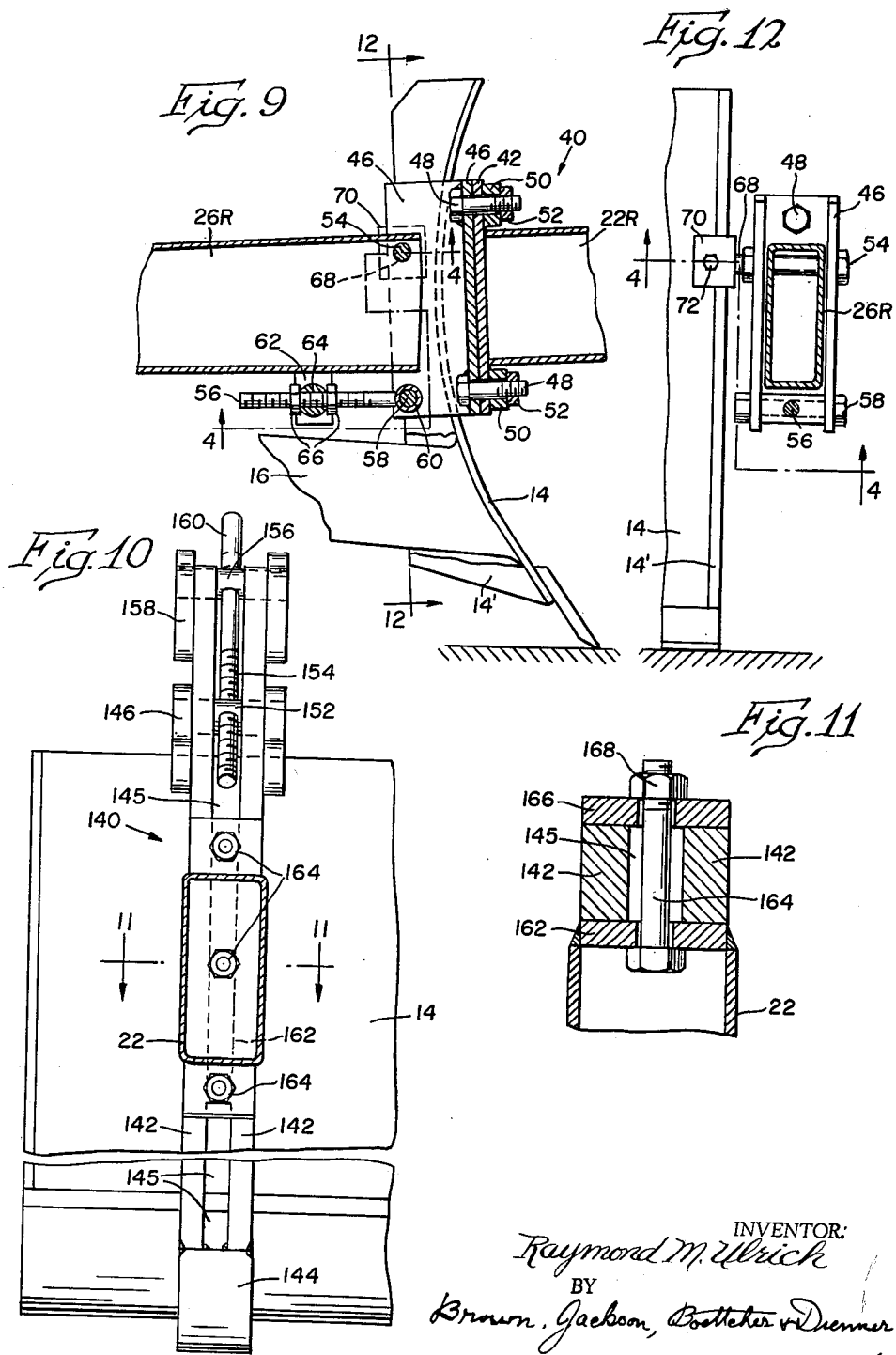

United States Patent Office 3,109,353
Patented Nov. 5, 1963

3,109,353
ROAD BASE SPREADING APPARATUS
Raymond M. Ulrich, Roanoke, Ill., assignor to Ulrich Manufacturing Co., Roanoke, Ill., a corporation of Delaware
Filed Feb. 24, 1960, Ser. No. 10,637
10 Claims. (Cl. 94—46)

The present invention relates to improvements in apparatus for spreading earth, gravel, crushed stone, rock and similar materials employed as the base for roads and the like.

In the co-pending application of Raymore D. MacDonald Serial No. 789,764, filed January 9, 1959, issued as Patent No. 2,962,947 on December 6, 1960, and assigned to the assignee of this application, there is disclosed improved apparatus for spreading base materials for roads directly from dump trucks onto the roadbed, the apparatus comprising, in combination, a bulldozer comprising a tractor, a vertically movable transverse moldboard blade at the front of the tractor and pusher arms connected to said blade and movably mounted on said tractor, together with a spreading attachment comprising a pair of side assemblies extending forwardly of said blade from adjacent the opposite ends thereof, push arms connected to the rearward ends of said side assemblies and pivotally mounted on the pusher arms of the bulldozer for mounting the spreading attachment at its rearward end on said bulldozer, ground engaging wheels adjacent the forward ends of said side assemblies supporting the forward end of said spreading attachment on the roadbed, said side assemblies defining a forwardly open space for entry of a truck between the forward end portions of said side assemblies, said sides assemblies and said blade defining a three-sided hopper rearwardly of said forward end portions of said side assemblies and said wheels for reception therein directly from the truck of material to be spread, said side assemblies comprising means for laterally confining the material to a strip of predetermined width and said blade constituting the rear wall of said hopper and comprising means for pushing before it a substantial load of the material and for striking-off the material at a predetermined level, and support means extending between said blade and said side assemblies supporting said moldboard blade on said side assemblies.

By virtue of the defined combination, the massive moldboard blade of the bulldozer comprises part of the spreading hopper and is supported on the spreading attachment substantially centrally between the ground engaging wheels at the front of the attachment and the point of connection the pusher arms of the blade to the tractor, thereby to derive its position relative to the roadbed from the wheels to insure accuracy in the material strike-off level of the apparatus. The advantages of such combination, as enumerated in the said prior MacDonald Patent 2,962,947, are many, principal among which are the facility with which a bulldozer may be converted to a base spreading apparatus, the elimination of the disadvantages inherent in prior art spreaders requiring removal from the tractor of the bulldozer blade and its push arms, and the utilization of the massive moldboard blade of the bulldozer as the back wall of the hopper and the strike-off means of the apparatus.

The object of the present invention is to provide improvements in the defined combination, and in particular, to simplify the apparatus, effect marked economies therein, increase the facility with which the spreading attachment is combined with the bulldozer, and improve the manner in which the bulldozer blade is adjustably supported on the spreading attachment.

In the respects pertinent to the object stated in the preceding paragraph, the spreading attachment disclosed in the said MacDonald Patent 2,962,947 includes both front and rear cross beams of variable length extending transversely between the two side assemblies, push arms adjustably mounted on the side assemblies and extending rearwardly therefrom for attachment to the pusher arms of the bulldozer, a pair of elongate upright clamps to be secured to the bulldozer blade adjacent the opposite ends thereof, and a pair of depth adjustment rods connected respectively to the clamps and extending through the rear cross member for suspending the blade in a relatively free-floating manner from the rear cross member of the spreading attachment.

It is a particular object of this invention to eliminate the said rear cross member of the apparatus illustrated in said MacDonald Patent 2,962,947, and to provide in place thereof vastly simplified means whereby the bulldozer blade itself forms a cross beam between the side assemblies at the rear thereof.

Another object of the invention is to provide vartly simplified means for adjusting the strike-off level of the blade and supporting the blade in adjusted position on the spreading attachment.

A further object of the invention is the provision of improved spreading apparatus comprising a combination of the general character above defined including a spreading attachment comprising a pair of side assemblies extending forwardly of the bulldozer blade from adjacent the opposite end portions therof, ground engaging means adjacent the forward end of each side assembly supporting the forward end of the spreading attachment on the roadbed, connecting means clampingly engaged with each side assembly adjacent its rearward end and with the adjacent end portion of the blade and clamping the blade between said side assemblies to interconnect the side assemblies and the blades and constitute the blade a cross beam betwen the rearward ends of the side assemblies, and adjustable support means operatively disposed between said side assemblies and the pusher arms of the bulldozer adjustable to vary the relative disposition in the vertical plane of said side assemblies and the pusher arms and normally retaining said side assemblies in adjusted position relative to said pusher arms, thereby to adjust the vertical disposition of said blade and cause the blade to be supported in adjusted position on the spreading attachment.

A still further object of the invention is the embodiment of the aforesaid connecting means and adjustable support means in a variety of forms facilitating adaptation of the spreading attachment to all bulldozers and affording optimum utilization of the components of the bulldozer. It is in particular an object of the invention to provide spreading attachments including connecting means and adjustable support means for utilization especially with rigidly mounted bulldozer blades, and other spreading attachments having means for connection with bulldozer blades of the adjustable pitch type and wherein the pitch adjusting means of the bulldozer is employed at least in part as the aforesaid adjustable means of the combination of this invention.

Other objects and advantages of the invention will become apparent in the following detailed description.

Now, in order to acquaint those skilled in the art with the manner of making and using my improved spreading apparatus, I shall describe, in connection with the accompanying drawings, preferred embodiments of the spreading apparatus, and preferred manners of making and using the same.

In the drawings, wherein like reference numerals indicate like parts:

FIGURE 1 is a view in side elevation of a bulldozer one embodiment of the spreading attachment of the invention and a dump truck, the view illustrating the cooperative association of the three vehicles for purposes of spreading base materials;

FIGURE 2 is an enlarged side elevation of said one embodiment of the spreading attachment of the invention and the blade of the bulldozer, the view illustrating in dotted lines the vertical adjustability of the spreading attachment and the bulldozer blade;

FIG. 3 is a plan view of the apparatus shown in FIGURE 2;

FIGURE 4 is a fragmentary bottom plan view, on an enlarged scale, looking upwardly approximately on the planes of the lines 4—4 of FIGURES 9 and 12, showing the underside of the connecting and adjusting means provided in the said one embodiment of the invention;

FIGURE 5 is a side elevational view of the combination of a bulldozer and a second embodiment of the spreading attachment of the invention;

FIGURE 6 is a fragmentary side view, on an enlarged scale, of the bulldozer blade and connecting means of the combination illustrated in FIGURE 5, the view depicting in dotted lines one manner of adjusting the height of the blade;

FIGURE 7 is a view similar to FIGURE 6 illustrating another manner of adjusting the height of the blade in the said second embodiment of the invention;

FIGURE 8 is a view similar to FIGURE 6 of a third embodiment of the invention.

FIGURE 9 is a fragmentary longitudinal sectional view taken approximately on the planes of the lines 9—9 of FIGURES 3 and 4;

FIGURE 10 is a fragmentary sectional view taken approximately on the plane of the line 10—10 of FIGURE 6 illustrating in a rearward edgewise view each of the upright bars or struts utilized in FIGURES 5, 6, 7 and 8 for joining each of the two side assemblies of the base spreader to its respective end of the moldboard blade;

FIGURE 11 is a horizontal detail sectional view taken on the plane of the line 11—11 of FIGURE 10, this view being on a larger scale; and FIGURE 12 is a fragmentary front sectional view taken on the plane of the line 12—12 of FIGURE 9.

Referring now to the drawings, I have shown in FIGURE 1 the manner of association and use of the apparatus employed according to the invention for spreading base materials. As shown, the apparatus includes a standard bulldozer comprised of a tractor 10 and a bulldozer attachment 12, the attachment including a conventional moldboard blade 14 extending transversely of the tractor forwardly thereof, a pair of primary blade mounting push arms 16 extending rearwardly from adjacent the opposite ends of the blade and pivotally mounted adjacent their rearward ends on pivot studs 17 carried on opposite sides of the tractor, and means 18 for effecting raising and lowering arcuate movement of the blade and primary push arms 16 in a vertical direction about the horizontal pivot axis 17 of the primary push arms 16. Mounted on and cooperating with the bulldozer is one embodiment of the spreading attachment of my invention, which is indicated generally at 20. This attachment comprises a pair of side assemblies generally designated 22 (and more specifically designated 22R for the right hand side of the spreader and 22L for the left hand side, as viewed from the driver's position) these two side assemblies extending forwardly from adjacent the opposite ends of the blade 14, with a ground engaging wheel 24 supporting each side assembly at its forward end, and a secondary or attachment push arm 26 extending rearwardly from each side assembly and mounted at its rearward end on the adjacent primary push arm 16 of the bulldozer. Due to their relative dispositions, the side assemblies 22R and 22L and the moldboard blade 14 define a three-sided hopper for reception of base materials to be spread, the side assemblies comprising means for laterally confining the base material and the blade comprising the rear wall of the hopper and means for striking-off the base material at a predetermined depth or thickness.

In use, a dump truck 28 containing base material to be spread is backed into the space between the wheels 24 and the forward end portions of the side assemblies 22R and 22L of the spreading attachment, and its load is dumped, gradually or all at once depending upon relative capacities, into the hopper defined rearwardly of the wheels. The bulldozer is then advanced forwardly, causing conjoint forward movement therewith of the spreading attachment. Preferably, the spreading attachment 20 includes a front cross beam 30 having rollers 41 thereon engageable with the wheels of the truck 28 to push the truck forwardly of it, so that the described apparatus advances simultaneously along the roadway. During this movement, the side assemblies 22R and 22L laterally confine the base material to be spread to a strip of predetermined width, and the blade 14 is adjusted vertically to strike-off the material at a predetermined depth or thickness, thereby to restrict the material to the desired area and the desired depth. The wheels 24 of the attachment 20 ride on the roadbed forwardly of the hopper area and thus serve as a bench or guide mark for the spreading operation. When the truck is empty, it is driven away and another truck loaded with base material is backed into dumping position relative to the spreading attachment to maintain a supply of base material for the spreading operation. Spreading thus continues, continuously or intermittently depending upon the continuity of supply, to cause a layer of base material of uniform width and thickness to be spread along the desired portion of the roadway.

As with the spreading attachment disclosed in the said prior Patent No. 2,962,947 of Raymore D. MacDonald, the front cross beam 30 is disposed between the forward end portions of the side assemblies 22R and 22L rearwardly of the wheels 24 at a sufficiently low level to accommodate passage thereover of the body of the dump truck, as illustrated in FIGURE 1. The side assemblies 22 each comprise a frame portion 31 including a generally horizontally extending beam or channel and a support bracket 33 depending from the forward end of the beam. Mounted on the frame portion 31 immediately rearwardly of and parallel to the bracket 33 is a pintle pin 34 on which a wing 35 is mounted for swinging movement about the generally upright axis of the pin. This wing adjustably mounts a gate 36 which extends rearwardly therefrom beneath the beam or channel 32, the vertical positioning and vertical angularity of the gate 36 being adjustably established by the two bolts 37, and the horizontal angularity of the gate (FIG. 3) being adjustably retained by the chain 78, all as disclosed in the aforesaid MacDonald patent. The side assemblies thus define a forwardly open space between the forward end portions thereof for entry of the truck, so that the material from the truck is dumped rearwardly of the wheels 24 whereby the wheels may ride on the roadbed and serve as a bench mark for the spreading operation. Also as disclosed by MacDonald, the beam 30 is of sectional construction so as to be of variable length to accommodate variation in the lateral spacing of the side assemblies, thereby to facilitate adaptation of the attachment to bulldozer blades of various widths. In adapting the attachment to the bulldozer, the cross beam 30 is adjusted to substantially the width of the blade 14 and the side assemblies are disposed to extend forwardly from just outwardly of the opposite ends of the blade. The secondary push arms 26 of the spreading attachment extend rearwardly from the side assemblies and inwardly therefrom to the primary push arms 16 of the bulldozer. At its rearward end, each secondary push arm 26 of the spreading attachment is pivotally mounted on a horizontal pivot axis 55 carried by the respective bulldozer or primary push arm 16, the mounting being such as to restrain the secondary push arms 26 against relative lateral and fore and aft movement, but preferably being such as to define the said transverse horizontal pivot axis 55 between the primary push arm 16 and the secondary push arm 26.

At its forward end, each secondary push arm 26 is connected to the respective side assembly 22R and 22L by an improved connecting means, indicated generally at 40, (also designated 40R for the right hand side assembly 22R and designated 40L for the left hand side assembly) which serve to provide means interconnecting the secondary push arm 26 and its respective side assembly, interconnecting the side assemblies and the blade, and supporting the blade on the side assemblies in any desired position of vertical adjustment. This connection, which is best shown in FIGURES 2 and 4, comprises a rearwardly concave flange 42 secured, as by welding, to the rearward end of the respective side assembly 22, the flange 42 projecting above and below the beam portion of the side assembly and having a horizontal slot 44 in each of its said projecting portions. Cooperable with the flange 42 is a generally upright member 46 of U-shape as viewed in plan, the member having a convex forward surface in the form preferably of a semi-cylinder, complemental to the rearwardly facing concave surface of the flange 42. The member 46 is of substantially the same height as the flange 42 and adjacent its upper and lower ends carries a pair of forwardly projecting studs 48 which project through the slots 44 in the flange 42, thereby to mount the member 46 on the flange for angular adjustment in the horizontal plane about a generally upright axis. These studs 48 also define retaining or clamp means whereby the member 46 may be rigidly clamped to the flange 42, and for this purpose suitable washers 50 are placed on the studs 48 and a nut 52 is threaded on the forward end portion of each stud. By virtue of this construction, the member 46 is mounted on the flange 42, and thus the side assembly 22, for pivotal adjustment about an upright axis, is adapted to be quickly attached to and detached from the flange 42, and is adapted to be rigidly secured to the flange 42 upon tightening of the nuts 52.

The respective secondary push arm 26 extends into the rearwardly open space defined between the legs of the U-shaped member 46 and is mounted within the member by means of a bolt 54, the bolt and the legs of the U cooperating with the secondary push arm 26 to restrain the same against angular movement in the horizontal plane relative to the member 46. Consequently, the secondary push arm 26 is adjustably connected by means of the U-shaped member 46 to the side assembly 22 for horizontal angulation relative to the side assembly to accommodate lateral swinging of the secondary push arm 26 rearwardly and inwardly to the respective primary blade push arm 16 of the bulldozer, thereby to accommodate mounting of the secondary push arm 26 of the spreading attachment on the primary push arm 16 of the bulldozer irrespective of the width of the bulldozer blade and the disposition of the primary push arms 16 relative to the blade. Once the adjustment has been effected, the nuts 52 are tightened fixedly to retain the secondary push arm 26 and the respective side assembly 22 in horizontally or transversely adjusted position relative to one another and the bulldozer.

The bolt 54 also serves as a pivot pin for mounting the secondary push arm 26 on the U-shaped member 46 for pivotal movement about a transverse horizontal axis thereby to accommodate vertical angulation of the secondary push arm 26 relative to the side assembly. To adjust the degree of vertical angulation between the secondary push arm and the side assembly, and to retain the secondary push arm and side assembly in adjusted positions of vertical angulation, the connecting means 40 includes an adjustable strut which in the illustrated embodiment of the invention comprises a longitudinally extending bolt or stud 56. As shown, this bolt or stud is pivotally mounted at its forward end on the U-shaped member 46 by means of a second transverse pivot pin or bolt 58, which preferably extends transversely between the legs of the U-shaped member at a location below the lower side of the secondary push arm 26. With such arrangement, the pivot pin or bolt 54 is preferably located adjacent the upper side of the secondary push arm. For purposes of mounting the strut 56 on the pivot pin or bolt 58, the strut is provided with a cylindrical tubular T-head 60 of a length equal approximately to the spacing between the legs of the U-shaped member, which head 60 is disposed between the legs of the U with the bolt 58 passing therethrough. In rearwardly spaced relation to the U-shaped member 46, the secondary push arm 26 carries at its lower surface an inverted U-shaped bracket 62 having laterally spaced legs which pivotally mount therebetween an abutment 64. The abutment 64 is suitably apertured for passage therethrough of the strut 56, and nuts 66 are threaded on the strut to opposite sides of the abutment. By virtue of the nuts 66 engaging against the abutment 64, the secondary push arm 26 and side assembly 22 may be retained in substantially any desired position of vertical angulation, the nuts 66 being adjustable on the strut 56 to accommodate variation in relative vertical angulation. If desired, as will be apparent to those skilled in the art, lock nuts (not shown) may also be associated with the strut 56 and the adjusting nuts 66.

In addition to the above described elements, the connecting means 40 of the invention includes means engageable with the bulldozer blade 14 and adapted for interconnection therewith. The embodiment of the invention illustrated in FIGURES 1 to 4 includes as said means a transverse horizontal pivot pin or stud 68 and a complemental socket 70, the stud 68 preferably being mounted on the respective U-shaped member 46 and the socket 70 being mounted on the adjacent end portion of the blade. As shown particularly in FIGURE 4, each socket 70 may be formed as a detachable assembly including a socket body having a wedge receiving pocket, a wedge 72 in the pocket and a wedge actuating screw 74, whereby the socket member may be clamped to the rearward edge portion of the end flange 14' of the blade 14. Alternatively, the socket body might simply be welded to the end flange 14' of the blade, or said flange may have a socket drilled therein. Each socket fixture 70 has a substantially horizontal cavity or pocket 70' entering inwardly from the outer side of the socket fixture 70, as clearly shown in FIGURE 4. The stud or pivot pin 68, while capable of variation in structure and location, is depicted herein simply as an elongate inwardly extending head on the secondary push arm pivot bolt 54. In mounting the spreading attachment on the bulldozer, each pin 68 is entered into the respective socket or cavity 70' of the socket fixture 70, whereby to pivotally interconnect the blade and the side assemblies. Also, by virtue of the clamping function of the studs 48 and nuts 52, for holding the joined ends of the secondary push arms 26 and side assemblies 22 pressed or deflected inwardly, the pins 68 can be firmly pressed endwise inwardly into their respective pockets or cavities 70' to cause the blade to be firmly gripped between the side assemblies 22, whereby the blade is caused to constitute a rigid cross beam between the rearward ends of the side assemblies. Because of this, I am able to eliminate entirely, as depicted in the drawings of this application, the rear cross beam that formed an integral part of the spreading attachment disclosed in the aforesaid prior patent of Raymore D. MacDonald. Not only that, but the pins 68 and sockets 70 serve pivotally to interconnect the rearward ends of the side assemblies and the blade for conjoint vertical movement so that, as the vertical angularity between the secondary push arms 26 and the side assemblies 22 is changed, the blade is raised and lowered by virtue of the raising and lowering of the rearward ends of the side assemblies, as will be appreciated from the solid and dotted line representations in FIGURE 2. Thus, I have also eliminated the complicated blade clamps and depth adjusting rods of the apparatus disclosed in said prior MacDonald Patent 2,962,947. From the solid line and dotted line representations in FIGURE 2, it will be seen the proximate rear end of the side assembly 22 and the proximate front end of the secondary push arm 26 have relative vertical movement therebetween in a vertical jack-knifing relation.

For purposes of discussion, let us assume that it is desired to elevate the bulldozer blade 14 from the position shown in solid lines in FIGURE 2 to the position shown in dotted lines in that figure. To accomplish this result, the raising and lowering mechanism 18 of the bulldozer is energized to maintain the blade 14 in its original or sold line position. The nuts 66 are then threaded away from the abutment 64 to release the strut for relative movement. The blade raising mechanism 18 is then actuated to elevate the blade a predetermined distance, and to retain the blade in its elevated position. The nuts 66 are then tightened into engagement with the abutment 64 (and locked in such position if desired), and the mechanism 18 is de-energized to cause the blade to float relative to the tractor and thus to be supported on the spreading attachment, and in particular to be supported on the attachment substantially centrally between the wheels 24 and the pivot axis of the primary push arms 16 of the bulldozer. The struts 56 as provided according to the invention may be quite short and yet accommodate marked variation in the elevation of the blade 14. For example, with the arrangement depicted in FIGURE 2, the ratio of blade elevation to strut adjustment is about 4 to 1. In other words, the blade may be raised about 12 inches by a strut adjustment of about 3 inches. In any position of adjustment thereof, each strut maintains the adjusted angularity in the vertical plane between the side assembly 22 and its secondary push arm 26 and causes the blade to be supported in its adjusted position on the spreading attachment. Also, each strut is individually adjustable to accommodate support of the blade in a laterally tilted position to facilitate crowning of the material to be spread.

With regard to the adjustable struts 56, it is to be observed that due to the weight of the massive moldboard blade 14, it is the nut 66 at the rearward side of the abutment 64 that determines the adjusted position of support of the blade 14 on the side assemblies 22, and that for purposes of adjustable support of the blade on the spreading attachment the nut 66 at the forward side of the abutment 64 is not required. However, I prefer to utilize a nut at the forward side of the abutment so that the blade and the side assemblies will be fixedly interconnected whereby the spreading attachment may be elevated off the ground together with the blade 14 upon actuation of the blade raising and lowering means 18 thereby to facilitate turning of the apparatus, especially turning around in a relatively short radius, and loading of the spreading attachment onto a lowboy or other transporting vehicle when the spreading attachment is to be detached from the bulldozer and transported to another place of use.

During vertical adjustment of the blade, it will be appreciated that the secondary push arms 26 of the spreading attachment will move substantially conjointly with the bulldozer blade 14 and primary blade push arms 16, so that the vertical angularity of the side assemblies 22 is caused to vary relative not only to the secondary push arms 26 of the spreading attachment, but relative to the blade 14 and the primary push arms 16 to an equal degree. Consequently, the struts 56 are effectively disposed between the side assemblies and the primary push arms of the bulldozer, are adjustable to vary the relative vertical disposition of the arms and side assemblies, and normally retain the same in adjusted position, thereby to adjust the elevation of the blade 14 and cause the blade to be supported on the spreading attachment. Also, because of the described construction, it is to be appreciated that the side assemblies could be pivotally mounted directly on the blade 14, and that the adjustable strut 56 could extend between the side assembly and the blade to accommodate the described vertical adjustment and to cause the blade to derive its support from the spreading attachment. This would result in the further elimination of the secondary push arms 26, which is entirely feasible as will be appreciated from the following description of FIGURES 5 to 8.

With the embodiment of the invention shown in FIGURES 1 to 4, the blade 14 is not required to be moved relative to the primary push arms 16 and the said embodiment is thus ideally suited to bulldozers of the type wherein the blade is rigidly connected to its primary push arms. This, of course, does not preclude use of the illustrated device with bulldozers having adjustable pitch blades, but for the latter type of bulldozer, I prefer to make optimum use of the bulldozer components and to effect further simplification of the spreading attachment.

Referring now to FIGURE 5, I have shown a bulldozer having a blade of the adjustable pitch type, the bulldozer including the same components as described with reference to FIGURE 1 and also including transverse horizontal pivot pins 100 pivotally mounting the blade 14 on the pusher arms 16 (or a C-frame including corresponding pusher arms) and adjustable strut means 102 extending between the pusher arms and the blade for pivoting the blade about the pins 100, thereby to vary the pitch of the blade. For cooperation with such blade, I provide a spreading attachment 20 including, as before, a pair of transversely spaced side assemblies 22, a ground engaging wheel 24 adjacent the forward end of each side assembly and a front cross beam 30 extending between the side assemblies rearwardly of the wheels. At the rearward end of each side assembly, I provide a modified form of connecting means, indicated generally at 140, including blade clamps for mounting the side assemblies directly on the blade. As shown in FIGURE 6, each of the connecting means 140 comprises an upright clamping post or strut member 142 of a height greater than the blade having a fixed blade engaging hook 144 at its lower end and an adjustable blade engaging clamp 146 adjacent its upper end. The clamp 146 is pivotally mounted on the clamping post member 142 by means of a pivot pin 148 selectively enterable into any one of a plurality of vertically spaced transverse holes 150 in the member 142, thereby to accommodate vertical adjustment of the spacing between the hook 144 and the clamp 146 to facilitate adjustment of the assembly to the height of the blade 14, substantially irrespective of the height of the blade. The clamp 146 includes a rearwardly disposed hook portion engageable with the upper edge of the blade 14 and a forwardly extending lever portion pivotally mounting a nut 152 on a transverse horizontal axis. Threaded through the nut 152 is an adjustable clamp rod or stud 154 threaded through the nut 152. The stud 154 extends diagonally upward and rearward from the clamp 146 and adjacent its upper end passes freely through a pivot pin 156 pivotally mounted on a bracket 158 that is secured to the upper end of the member 142 at a location above the upper edge of the blade 14. At its upper end, the adjustable stud 154 is provided with a fixed head 160 engaging the upper surface of the pin 156 and adapted for manual rotation to thread the stud 154 into and out of the nut 152 thereby to raise and lower the forward end of the clamp 146 to engage the clamp with, and disengage the clamp from, the upper edge of the bulldozer blade 14.

When the upright member 142 is rigidly secured to the adjacent end portion of the blade, it defines a rigid strut adapted for securement thereto of the rearward end portion of the respective side assembly 22. For purposes of associating the same with the rigid strut 142, the side assembly 22 is provided at its rearward end with a transverse flange 162 having a plurality of vertically spaced rearwardly extending studs 164 rigidly secured thereto, as by welding. These studs are adapted to extend through a vertically extending slot 145 (FIGURES 10 and 11) provided in the member 142, or through respective ones of a plurality of vertically spaced holes provided in the member 142 in the direction of the longitudinal axis of the side assembly 22, whereby the side assembly is mounted for vertical adjustment on the member 142. Such vertical adjustability facilitates adaptation of the spreading attachment to substantially any bulldozer blade, irrespective of the height of the bulldozer blade, and also provides means for effecting relative vertical adjustment of the blade and the side assemblies, as will presently be described. For purposes of rigidly clamping the side assembly 22 to the rigid strut or member 142, I provide, at the rearward side of the sttrut, a detachable flange 166 complementary to the flange 162 and adapted for passage therethrough of the studs 164, and I rigidly clamp the two flanges, the side assembly and the member 142 together by means of nuts 168 threaded onto the studs 164. The vertically slotted construction of each post or strut member 142 is ilustrated in FIGURES 10 and 11, from which it will be seen that the slot 145 extends lengthwise of the post member over a substantial distance to accommodate a substantial range of vertically shiftable adjustment of the clamping studs 164 passing through the slot. For example, one preferred method of constructing each post or strut 142 is to make it of two spaced bars—with the slot 145 defined therebetween—the lower ends of said spaced bars being welded or otherwise secured to the lower blade engaging hook 144 and the upper ends being coupled together by the pivot pin 148 of the upper blade engaging clamp 146.

By virtue of the described connecting means 140, each side assembly 22 is rigidly clamped at its rearward end to the adjacent end portion of the bulldozer blade 14. Actuation of the blade raising and lowering means 18 will thus cause the blade and the spreading attachment to move conjointly, so that the spreading attachment may be raised off the ground for purposes particularly of turning the apparatus around and loading the spreading attachment onto and off of a transporting vehicle. This, of course, is simply for raising the attachment off the ground, and does not result in variation of the elevation of the blade for strike-off purposes in spreading operations. The latter adjustment may be effected in either of two ways, the simplest of which is depicted by dotted line representation in FIGURE 6. In particular, as represented in said figure, the pitch adjusting struts 102 of the bulldozer assembly may be elongated to move the upper end of the blade forwardly about its pivot axis 100. As this occurs, the upright strut or member 142 is moved toward a vertical position, and then into an upwardly and forwardly inclined position. As this occurs, the rearward end of each side assembly 22 must tilt by an equal amount, which causes the rearward end of each side assembly to move upwardly due to the engagement of its forwardly disposed supporting wheel with the roadbed. Due to the rigid interconnection of the rearward end of the side assembly and the blade, the blade 14 must also move vertically upward. From this it is seen that elevation of the blade 14 may be increased simply by elongating the struts 102, and may be decreased simply by shortening the struts 102. Also, with bulldozer constructions wherein an adjustable strut 102 is provided between each blade push arm 16 and the adjacent end of the blade, the struts may individually be adjusted to cause the blade to assume a tilted position, which at least to a limited degree would be accommodated by the spreading attachment due to the length of the side assemblies thereof.

The second manner of effecting blade adjustment of this embodiment of the invention will be appreciated from a comparison of FIGURES 6 and 7. Starting with the blade and spreading attachment in the relative positions shown in solid lines in FIGURE 6, the operator would loosen the nuts 168 to accommodate vertical sliding movement of the upright members 142 relative to the rearward ends of the side assemblies 22. At this time, the spreading attachment would rest substantially parallel to ground level by virtue of engagement of its wing gates and wheels with the ground. The blade elevating apparatus 18 could then be energized to raise the blade to substantially the desired height above ground level. As this movement occurs, the struts 102 may be adjusted to compensate for variation in the angular position relative to ground level of the strut members 142. However, for most adjustments of the blade, such variation should be relatively slight or substantially nonexistent, due to initial disposition of the members 142 in close approximation of the path of movement of the blade. As the blade is raised, the members 142 pass vertically upward relative to the side assemblies 22 until the blade attains substantially the desired the desired position of elevation above the ground level. The nuts 168 are then tightened rigidly to interconnect the blade and the side assemblies. Then, the struts 102 may be adjusted slightly to effect final adjustment of blade elevation and to elevate the wing gates of the spreading attachment slightly above ground level. This second form of adjustment has the advantage of maintaining the spreading attachment substantially horizontal and negativing any substantial increase in the elevation of the cross beam 30 above ground level, thereby to insure passage of the bodies of dump trucks over the beam 30.

With either method of adjustment, the struts 102 serve to maintain the blade and side assemblies in precisely adjusted relative position so that the blade raising and lowering means 18 may be de-energized, whereupon the blade 14 will derive its support from the side assemblies and the ground engaging wheels of the spreading attachment. In particular, the blade 14 will be supported by the spreading attachment substantially centrally between the wheels 24 and the point of pivotal mounting of the blade or tractor push arms 16 on the tractor 10, whereby the same character of blade support as described in conjunction with FIGURES 1 through 4 is maintained. By virtue of the rigid interconnection of the blade and the side assemblies, it is also to be appreciated that the adjustable strut means 102 are effectively disposed between the blade or tractor push arms 16 of the bulldozer and the side assemblies and are adjustable to effect variation in the relative disposition in the vertical plane of the tractor push arms and the side assemblies, thereby to adjust the vertical disposition of the blade 14 and to cause the blade to be supported in its adjusted position on the spreading attachment.

Referring now to FIGURE 8, a further embodiment of the invention is shown which is capable of adjustment in substantially all of the manners previously discussed herein, i.e., the manner described in conjunction with FIGURES 1 to 4 and both of the manners described in conjunction with FIGURES 5 to 7. As shown, this embodiment of the invention is generally the same as the embodiment of the invention illustrated in FIGURES 5 to 7, and in particular, includes the same blade clamp assembly as indicated by employment of the same reference numerals. In this case, however, the means for securing the respective side assemblies 22 to the upright members or struts 142 is different from that depicted in FIGURES 5 to 7. In particular, the means for clamping each side assembly to the respective member 142 comprises a pair of threaded studs or adjustable struts 264 pivotally mounted respectively on transverse horizontal axes 265 adjacent the upper and lower edges of the side assembly 22. The studs or struts 264 extend rearwardly through the vertical slot 145 provided in the member 142 and also through suitably apertured flanges 262 and 266 disposed to the front and rear sides of the member 142. For purposes of rigidly securing the struts and the flanges to the upright member, nuts 268 are threaded on the struts forwardly of the front flange 262 and rearwardly of the rear flange 266. As will be appreciated, the nuts 268 may be loosened to accommodate relative vertical movement between the member 142 and the side assembly 22 as with the embodiment of the invention shown in FIGURES 5 to 7, and may also be relatively adjusted on the struts 264 to accommodate relative angulation in the vertical plane between the side assembly 22 and the member 142 as with the embodiment of the invention shown in FIGURES 1 to 4. In addition, the connecting means accommodates adjustment of blade elevation by virtue of adjustment of the pitch adjusting struts 102. Thus, the illustrated assembly includes substantially the same adjustments as provided in the embodiment of the invention depicted in FIGURES 5 to 7, and includes, in duplicate, the adjustable strut means of the embodiment of the invention shown in FIGURES 1 to 4. Consequently, this embodiment of the invention accommodates a variety of adjustments to permit variable elevation of the blade 14, irrespective of the nature of the mounting of the blade on the blade or tractor push arms 16. In all instances, the adjustable means is effectively disposed between the side assemblies 22 and the blade push arms 16 of the bulldozer and is adjustable to accommodate variation in the relative disposition in the vertical plane of the side assemblies and the push arms, thereby to facilitate vertical adjustment of the blade and to cause the blade to be supported in adjusted position on the spreading attachment. In its adjusted position, as with the other embodiments of the invention, the blade is supported by the spreading attachment at a location substantially centrally between the wheels 24 of the spreading attachment and the point of pivotal mounting of the blade push arms 16 on the tractor.

From the solid line and dotted line representations in FIGURE 6, it will be seen that the proximate rear end of each side assembly 22 and the proximate front end of each push arm 16, in each of the other embodiments shown in FIGURES 5 to 8 inclusive, also have relative vertical movement therebetween in a vertical jack-knifing relation, similar to that described of the embodiment shown in FIGURES 1–4 and 9.

For the sake of clarity of disclosure, I have omitted from the accompanying drawings and the foregoing description the blade extension means that are provided to close off the space between the blade 14 and the wing gate means 35, 36 of the side assemblies 22. It will be appreciated, particularly by those skilled in the art, that suitable blade extension means may be mounted on each side assembly 22 adjacent the connecting means 40, or that blade extensions may be mounted directly on the opposite end portions of the blade. A suitable form of blade extension means is disclosed in the said prior patent of Raymore D. MacDonald, as are further details of construction relating to the side assemblies, the wheels and their mounts, etc.

From the foregoing, it is to be appreciated that the present invention provides marked improvements in the combination of a bulldozer and a spreading attachment, the present invention particularly resulting in elimination of the rear cross beam and the complex and loosely associated depth adjustment means of the apparatus illustrated and described in the said copending application. Also, in some embodiments, push arm means for the spreading attachment are eliminated. Yet, the apparatus of this invention is just as sturdy and reliable and as capable of performing intended functions as the prior apparatus. Thus, it is apparent that all of the objects of the invention have been shown herein to be achieved in a convenient, economical and practical manner.

While I have shown and described what I regard to be the preferred embodiments of my invention, it will be appreciated that various changes, rearrangements and modifications may be made therein without departing from the scope of the invention, as defined by the appended claims.

I claim:
1. Apparatus for spreading base materials for roads directly from a dump truck onto a roadbed comprising, in combination, a bulldozer comprising a tractor, a vertically movable transverse moldboard blade at the front of the tractor and push arms movably connected with said blade and movably connected with said tractor, and a spreading attachment comprising a pair of side assemblies extending forwardly of said blade from adjacent the opposite end portions thereof, ground engaging means adjacent the forward end of each side assembly supporting the forward end of said spreading attachment on the roadbed and connecting means connected with each side assembly adjacent its rearward end and connected with the adjacent end portion of said blade and serving to operatively engage said blade between said side assemblies to interconnect the side assemblies and the blade and constitute the blade a cross beam between the rearward ends of said side assemblies, said connecting means also comprising a substantially horizontal pivot and adjustable support means operatively disposed between the proximate rear ends of said side assemblies and the front ends of said push arms adjustable to vary the relative disposition in the vertical plane of said proximate ends of the side assemblies and push arms in a vertical jack-knifing relation, said adjustable support means normally retaining said side assemblies and said push arms in adjusted position, whereby to adjust the vertical disposition of said blade and to cause said blade to be supported in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

2. Apparatus for spreading base materials for roads directly from a dump truck onto a roadbed comprising, in combination, a bulldozer comprising a tractor, a vertically movable transverse moldboard blade at the front of the tractor and push arms movably connected to said blade and movably connected with said tractor, and a spreading attachment comprising a pair of side assemblies extending forwardly of said blade from adjacent the opposite end portions thereof, ground engaging means adjacent the forward end of each side assembly supporting the forward end of said spreading attachment on the roadbed and connecting means engaged with each side assembly adjacent its rearward end and with the adjacent end portion of said blade and operatively engaging said blade between said side assemblies to interconnect the side assemblies and the blade and constitute the blade a cross beam between the rearward ends of said side assemblies, said connecting means including a horizontally disposed transverse pivot pin pivotally interconnecting each side assembly with the adjacent end portion of said blade, said connecting means also including a substantially horizontal pivot axis pivotally inter-connecting the proximate rear end of said side assembly with the proximate front end of the adjacent push arm, and adjustable support means on each side assembly adjacent said blade adjustable to vary around said latter pivot axis the relative disposition in the vertical plane of the proximate rear end of said side assembly and the proximate front end of the adjacent push arm in a vertical jack-knifing relation, said adjustable support means normally retaining said side assemblies in adjusted position relative to said push arms, whereby to adjust the vertical disposition of said blade and to support the blade in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

3. Apparatus for spreading base materials for roads directly from a dump truck onto a roadbed comprising, in combination, a bulldozer comprising a tractor, a vertically movable transverse moldboard blade at the front of the tractor and primary push arms connected to said blade and movably mounted on said tractor, and a spreading attachment comprising a pair of side assemblies extending forwardly of said blade from adjacent the opposite end portions thereof, ground engaging means adjacent the forward end of each side assembly supporting the forward end of said spreading attachment on the roadbed, a secondary push arm extending between the rearward end of each side assembly and the adjacent primary push arm of the bulldozer, means pivotally mounting the rearward end of each secondary push arm of the spreading attachment on the respective primary push arm of the bulldozer, connecting means mounting each secondary push arm of the spreading attachment at its forward end to the rearward end of the respective side assembly and retaining the same against relative horizontal movement, said connecting means including a horizontally extending pivot for permitting relative adjusting movement between the forward end of said secondary push arm and the rearward end of said side assembly in a vertical plane said connecting means further including means connected with the adjacent end portion of the blade and mounting said blade between said side assemblies to interconnect the side assemblies and the blade and constitute the blade a cross beam between the rearward ends of said side assemblies, said connecting means also including adjustable support means operatively connected between each side assembly and the respective secondary push arm of the spreading attachment and adjustable to vary the angularity therebetween in a vertical jack-knifing relation around said horizontally extending pivot plane and normally retaining the same in adjusted position, thereby to adjust the vertical disposition of said blade and cause the blade to be supported in adjusted position on the spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

4. A base spreading attachment for use in combination with a bulldozer having a forwardly disposed transverse blade, comprising a pair of laterally spaced side assemblies for extension forwardly from adjacent the opposite ends of the blade, ground engaging wheels adjacent the forward end of each side assembly for supporting the forward end of the attachment on the ground, a cross beam connected to and extending between said side assemblies rearwardly of said wheels but adjacent the forward ends of said side assemblies, said crossbeam being of sectional construction for accommodating variation in the length of said cross beam for varying the space between said side assemblies, a push arm extending rearwardly from each of said side assemblies for attachment at its rearward end to the bulldozer for supporting the rearward end of the attachment on the bulldozer, and connecting means interconnecting each side assembly and its respective push arm, said connecting means each comprising generally upright pivot means accommodating horizontal angulation of the push arm relative to the side assembly and also being connected to said push arm by a transverse pivot means, clamp means associated with said upright pivot means and normally retaining the push arm against relative movement in the horizontal plane, said transverse pivot means which is associated with said upright pivot means serving to accommodate vertical angulation of the push arm relative to the side assembly in a vertical jack-knifing relation, adjustable strut means extending generally longitudinally between the side assembly and the push arm adjustable to vary the relative vertical angulation thereof and normally retaining the same in adjusted position, and transverse pin means carried by said connecting means and having cooperative engagement with said blade.

5. A base spreading attachment for use in combination with a bulldozer having a forwardly disposed transverse blade, comprising a pair of laterally spaced side assemblies for extension forwardly from adjacent the opposite ends of the blade, ground engaging means adjacent the forward end of each side assembly for supporting the forward end of the attachment on the ground, a push arm extending rearwardly from each of said side assemblies for attachment at its rearward end to the bulldozer for supporting the rearward end of the attachment on the bulldozer, and connecting means interconnecting each side assembly and its respective push arm, said connecting means each comprising clamp means securing the push arm against movement in the horizontal plane relative to the side assembly, horizontally disposed transverse pivot means pivotally connecting said push arm with said side assembly for accommodating vertical angulation of the push arm relative to the side assembly in a vertical jack-knifing relation, adjustable strut means extending between the side assembly and the push arm adjustable to vary the relative vertical angulation thereof and normally retaining the same in adjusted position, and substantially horizontal pins carried by said connecting means on which said blade is mounted.

6. In base spreading apparatus having a pair of laterally spaced side assemblies and a push arm extending rearwardly from each side assembly; means for connecting each push arm to the respective side assembly comprising generally upright pivot means accommodating horizontal angulation of the push arm relative to the side assembly, gripping means associated with said pivot means and normally retaining the push arm against relative movement in the horizontal plane, said connecting means also comprising horizontally disposed transverse pivot means pivotally connecting said push arm with said generally upright pivot means for accommodating vertical angulation of the push arm relative to the side assembly in a vertical jack-knifing relation, and adjustable strut means extending between the side assembly and the push arm adjustable to vary the relative vertical angulation thereof around the axis of said transverse pivot means and normally retaining the same in adjusted position.

7. Apparatus for spreading base materials for roads directly from a dump truck onto a roadbed comprising, in combination, a bulldozer comprising a tractor, a vertically movable transverse moldboard blade at the front of the tractor, push arms pivotally connected on a transverse axis to said blade and movably mounted on said tractor and adjustable strut means extending between said blade and said push arms adjustable to pivot said blade about said axis, and a spreading attachment comprising a pair of side assemblies extending forwardly of said blade from adjacent the opposite end portions thereof, ground engaging means adjacent the forward end of each side assembly supporting the forward end of said spreading attachment on the roadbed, and connecting means clampingly engaged with each side assembly adjacent its rearward end and with the adjacent end portion of said blade and clamping said blade between said side assemblies to interconnect the side assemblies and the blade and constitute the blade a cross beam between the rearward ends of said side assemblies, said adjustable strut means being adjustable to change the pitch angle of said blade about said transverse axis and to vary the relative disposition in the vertical plane of said side assemblies and said push arms in a vertical jack-knifing relation, said adjustable strut means normally retaining the same in adjusted position, whereby to adjust the vertical disposition of said blade and cause the blade to be supported in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

8. Apparatus for spreading base material for roads directly from a dump truck onto a roadbed comprising, in combination, a bulldozer comprising a tractor, a vertically movable transverse moldboard blade at the front of the tractor, push arms pivotally connected on a transverse axis to said blade and movably mounted on said tractor and adjustable strut means extending between said blade and said push arms adjustable to pivot said blade about said axis, and a spreading attachment comprising a pair of side assemblies extending forwardly of said blade from adjacent the opposite end portions thereof, ground engaging means adjacent the forward end of each side assembly supporting the forward end of said spreading attachment on the roadbed, and connecting means clampingly engaged with each side assembly adjacent its rearward end and with the adjacent end portion of said blade and clamping said blade between said side assemblies to interconnect the side assemblies and the blade and constitute the blade a cross beam between the rearward ends of said side assemblies, said connecting means adjacent the rearward end of each side assembly including a first part clampingly engaged with the adjacent end portion of the blade, and a vertically movable second part movably mounted on said first part and normally clampingly engaged with said first part and the respective side assembly, said movable second part and said adjustable strut means being adjustable to change the pitch angle of said blade and to vary the relative disposition in the vertical plane of said side assemblies and said push arms in a vertical jack-knifing relation and normally retaining the same in adjusted position, thereby to adjust the vertical disposition of said blade and cause the blade to be supported in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

9. Apparatus for spreading base material for roads directly from a dump truck onto a roadbed comprising, in combination, a bulldozer comprising a tractor, a vertically movable transverse moldboard blade at the front of the tractor, pusher arms pivotally connected on a transverse axis to said blade and movably mounted on said tractor, and adjustable strut means extending between said blade and said pusher arms adjustable to pivot said blade about said axis, and a spreading attachment comprising a pair of side assemblies extending forwardly of said blade from adjacent the opposite end portions thereof, ground engaging means adjacent the forward end of each side assembly supporting the forward end of said spreading attachment on the roadbed, and connecting means clampingly engaged with each side assembly adjacent its rearward end and with the adjacent end portion of said blade and clamping said blade between said side assemblies to interconnect the side assemblies and the blade and constitute the blade a cross beam between the rearward ends of said side assemblies, said connecting means adjacent the rearward end of each side assembly including a substantially upright clamping post clampingly engaged with the adjacent end portion of the blade, a vertically movable second part slidably mounted on said clamping post and normally clampingly engaged with said post, and adjustable support means between said second part and the respective side assembly normally securing said second part to the side assembly, said adjustable support means and said vertically slidable second part and said adjustable strut means being adjustable to vary the relative disposition in the vertical plane of said side assemblies and said pusher arms in a vertical jack-knifing relation and normally retaining the same in adjusted position, thereby to adjust the vertical disposition of said blade and cause the blade to be supported in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

10. Apparatus for spreading base materials for roads directly from a dump truck onto a roadbed comprising in combination, a bulldozer comprising a tractor, a vertically movable transverse moldboard blade at the front of the tractor and push arms connected to said blade and movably mounted on said tractor, and a spreading attachment comprising a pair of side assemblies extending forwardly of said blade from adjacent the opposite end portions thereof, ground engaging means adjacent the forward end of each side assembly supporting the forward end of said spreading attachment on the roadbed, and connecting means clampingly engaged with each side assembly adjacent its rearward end and with the adjacent end portion of said blade and clamping said blade between said side assemblies to interconnect the side assemblies and the blade and constitute the blade a cross beam between the rearward ends of said side assemblies, said connecting means adjacent the rearward end of each side assembly including a substantially vertically extending clamping post, upper and lower clamping hooks connected with said post for effecting clamping engagement with the upper and lower edges of said blade, a vertically movable second part connected with the respective side assembly and slidably mounted on said clamping post for movement to different selected positions along said post, means for securing said second part against upward or downward movement along said post from such selected position, said movable second part being slidable along said post to change the pitch angle of said blade and to vary the relative disposition in the vertical plane of said side assemblies and said push arms in a vertical jack-knifing relation and normally retaining the same in adjusted position, thereby to adjust the vertical disposition of said blade and cause the blade to be supported in adjusted position on said spreading attachment, said side assemblies defining a forwardly open space for entry of a truck between the forward end portions of said side assemblies, said side assemblies and said blade defining a three-sided hopper rearwardly of said forward end portions of said side assemblies and said ground engaging means for reception therein directly from the truck of material to be spread, said side assemblies comprising means for laterally confining the material to a strip of predetermined width and said blade constituting the rear wall of said hopper and comprising means for pushing a substantial load of the material and for striking-off the material at a predetermined level.

References Cited in the file of this patent
UNITED STATES PATENTS 2,962,947   MacDonald _____ Dec. 6, 1960